Patented Nov. 24, 1925.

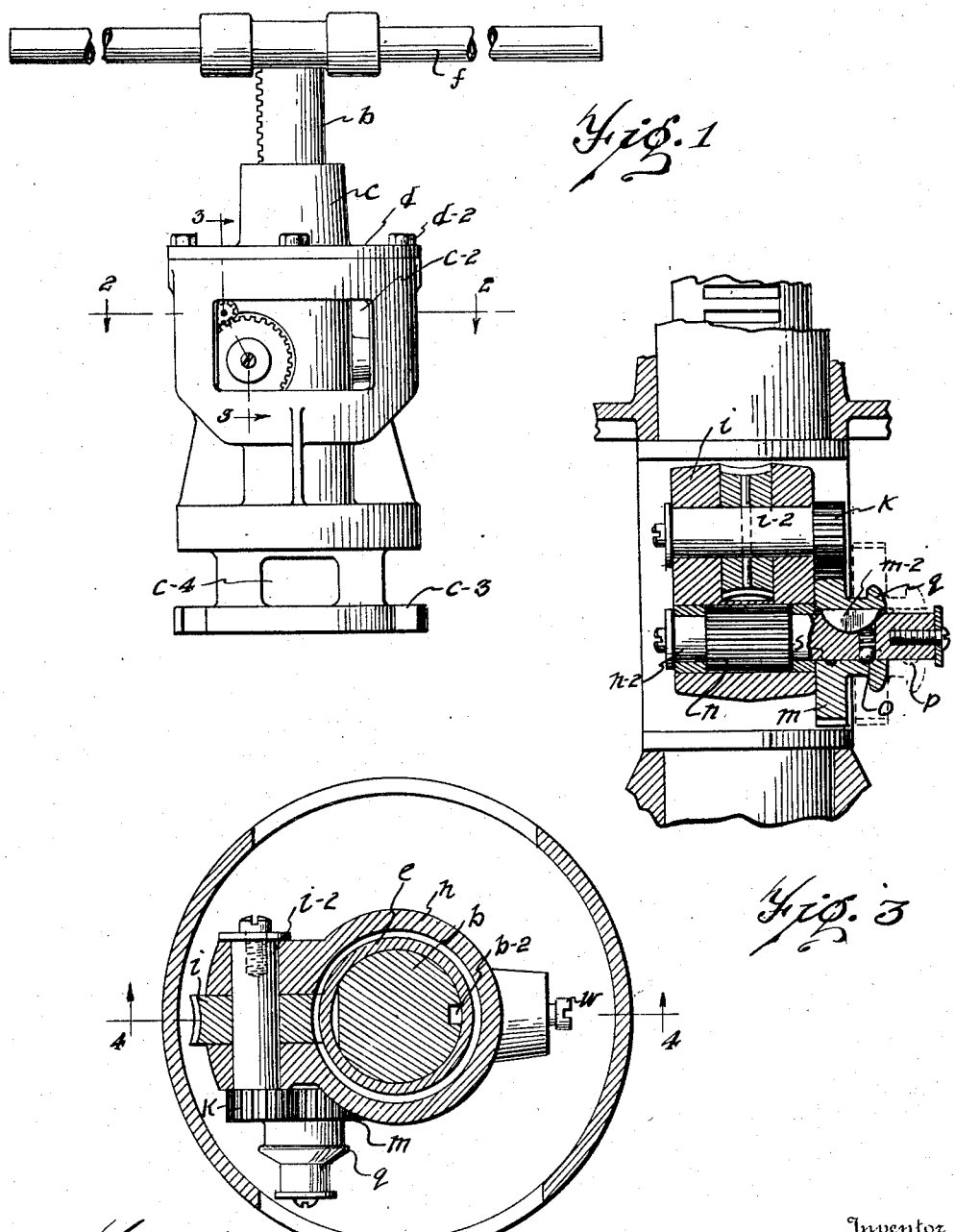

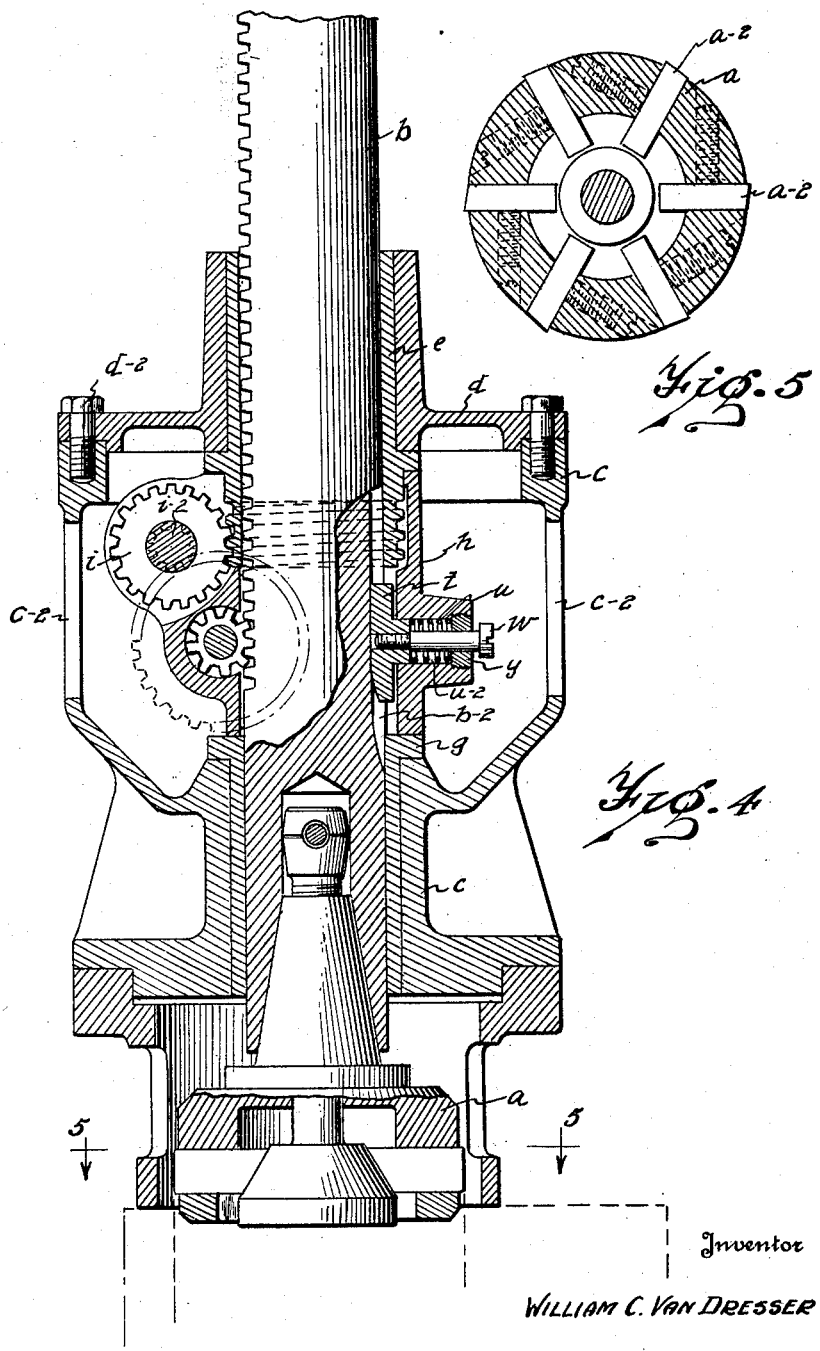

1,562,996

UNITED STATES PATENT OFFICE.

WILLIAM C. VAN DRESSER, OF DETROIT, MICHIGAN, ASSIGNOR TO VAN DRESSER BROTHERS, A COPARTNERSHIP COMPOSED OF SAID WILLIAM C. VAN DRESSER, WESLEY B. VAN DRESSER, AND FRANK P. VAN DRESSER, A COPARTNERSHIP OF MICHIGAN.

REBORING TOOL.

Application filed April 29, 1921. Serial No. 465,434.

*To all whom it may concern:*

Be it known that I, WILLIAM C. VAN DRESSER, a citizen of the United States, residing at Detroit, county of Wayne, and State of Michigan, have invented certain new and useful Improvements in Reboring Tools, of which the following is a specification.

My invention comprises a feed spindle, journalled within a housing for rotation, adapted to be advanced therethru as it is rotated, and carrying a cutter head, indicated in assembly as $a$. This cutter head forms the subject matter of a separate application filed April 25, 1921, Serial No. 464,156, and will therefore not be particularly described. The subject of this application relates to the method of feeding the cutter head, or, the mechanism adapted to advance the feed spindle.

Fig. 1 is a side elevation of my improved reboring tool.

Fig. 2 is a cross sectional view taken on line 2—2 of Fig. 1.

Fig. 3 is a longitudinal sectional view taken on line 3—3 of Fig. 1.

Fig. 4 is a longitudinal sectional view taken on line 4—4 of Fig. 2.

Fig. 5 is a cross sectional view taken on line 5—5 of Fig. 4.

Let $b$ indicate a rack cut feed spindle, provided at its lower extremity with the cutter head $a$. It is apparent that as concerns the instant application, the cutter head might be of any good conventional design.

The housing within which the spindle is journalled is indicated as $c$ and is cut away as at $c^2$ on opposite sides to provide access to the feeding mechanism. A cover plate $d$ is provided secured to the wall of the housing by means of screws $d^2$, and is formed with an axial annular shoulder adapted to retain the bearing member $e$, within which the feed spindle is journalled.

The mechanism for feeding the spindle here shown, is an improvement on my application, Serial No. 431,844, filed December 20, 1921. I provide means adapted to advance the spindle as the same is rotated. The spindle might be rotated by hand as shown in Fig. 1, in which a hand bar $f$ is shown or it might be adapted for power operation.

The bearing member $e$ is continued downwardly within the housing, and externally threaded as at $e^2$. A separate bearing member $g$ is likewise provided at the neck of the casing, the turned over flange of which forms a support for a casing which carries the feed mechanism driving gears. This casing is indicated as $h$, encircles the feed spindle and has a bearing upon the stationary, externally threaded, annular member $e$. The casing $h$ has a permitted clearance relative the feed spindle thereby providing for a certain floating movement from its bearing on the member $e$.

The feed mechanism comprises a feed gear $i$, mounted on a spindle $i^2$, journalled in the casing $e$. At one end of this spindle $i^2$ is provided a gear $k$, which is in engagement with gear $m$, which is releasably locked to spindle $n^2$, which spindle carries a pinion $n$, which pinion is in engagement with the rack of the feed spindle to advance the same when the pinion is rotated.

When the feed spindle is rotated, therefore, it is advanced through the rotation of the pinion $n$, except when the feed gear $m$ is out of engagement with the gear $k$.

Means are provided to move the gear $m$ to disengage the same from its driving relationship with the gear $k$. Said gear $m$ is keyed to the spindle $n^2$ by means of a key $m^2$ which travels in a provided keyway in the spindle, not shown in the drawing, and serves to actuate a spring controlled locking ball $o$, which normally rests in a provided recess $p$ in the thumb grip portion $q$ of the gear, but which ball when the gear is withdrawn outwardly on the spindle, is received in a provided ball seat $s$, releasably locking the gear in the disengaged position, thereby allowing the spindle to be freely withdrawn through the casing, the feed mechanism idling.

The feed mechanism casing $h$ is splined to the feed spindle to rotate therewith by a key $t$, received within a key-way $b^2$ extending longitudinally the feed spindle. This key $t$ is held yieldingly inwardly within the key-way in the spindle by means of a spring $u$, which bears against a shank $t^2$ of the key which is received within the spring receiving recess $u^2$ provided in the casing $h$. A screw $w$ is provided threaded into the key $t$ passing through a bearing $y$ carried by the casing.

It will be seen that in the operation of this machine the spring will have a tendency to hold the key to a seat in the key way cut in the feed spindle and will therefore draw the feed mechanism casing to one side so as to maintain a close engagement between the feeding pinion carried by the casing and the rack edge of the feed spindle, thereby taking up the wear and permitted play in the feeding mechanism.

The cutter head $a$, heretofore referred to, carries a series of adjustable, radially arranged cutter blades $a^2$, adapted to ream to the desired diameter, upon adjustment.

It is apparent that changes in detail construction and operation of the within described mechanism might be made without departing from the spirit of the invention.

The casing or housing of the mechanism is adapted to be secured to the cylinder block when it is desired to ream out a worn cylinder. Any convenient form of attachment may be provided. As shown in the drawing, bolt passageways $c^3$ are provided through a base flange, through which pass bolts of the cylinder block. The housing wall surrounding the cutter head is cut away as at $c^4$ to provide egress to the interior of the housing to the cutter head.

What I claim is:

1. In a reboring tool, a rack feed bar journalled for rotation, a stationary threaded member surrounding said bar, feed mechanism coupling the rack teeth of said bar with the thread of said stationary member to advance the bar upon its rotation, and means for maintaining yielding pressure on said feed mechanism tending to hold the same closely in mesh with the rack teeth of the feed bar.

2. In a cylinder reboring tool, a rack feed bar journalled for rotation, means for advancing the bar upon its rotation comprising a stationary threaded member encircling said bar, reduction gears engaged in the thread of said stationary member and with the rack teeth, and means for holding the feed gear which is engaged in the rack teeth of said bar yieldingly toward said bar.

3. In a cylinder reboring tool, a rack feed spindle journalled for rotation, a threaded annular stationary member surrounding said feed spindle, feed mechanism adapted to revolve with the spindle and comprising a pinion meshing with the spindle rack and a gear engaged in the thread of the stationary member, means connecting said gear and pinion so that the pinion will be rotated to advance the spindle as the spindle is rotated, means for maintaining practically constant, yielding pressure on said feed mechanism of such a character as to draw the feed gears thereof toward the members with which they are in engagement.

4. In a boring tool, a feed bar journalled for rotation, a stationary threaded member surrounding said bar, feed mechanism carried by the bar so as to rotate therewith, said feed mechanism engaged with the bar and with the stationary member to advance the bar as the bar is rotated, means likewise carried by the bar to rotate therewith adapted to exert substantially constant yielding pressure on said feed mechanism tending to maintain the same in engagement with the feed bar.

5. In a boring tool, a feed bar journalled for rotation, a stationary externally threaded member surrounding said bar, feed mechanism engaged with the bar and with the thread of the stationary member to advance the bar when the same is rotated, means for maintaining yielding, constant pressure on said feed mechanism tending to hold the same in close engagement with the bar.

6. In a reboring tool, a housing, a rack feed spindle extending therethru and journalled therein for rotation, a stationary externally threaded member surrounding said spindle, a sleeve surrounding said spindle and mounted within said housing for rotation, said spindle provided with a longitudinally extending key-way, a key carried by said sleeve engaged in the key way in the spindle so the sleeve and spindle will rotate as one piece, feed mechanism carried by said sleeve and coupled with the rack of the spindle and the thread of the stationary member to advance the spindle upon its rotation, spring means carried by said sleeve coacting with the key disposed in the key-way of the spindle in such a manner as to exert yielding, constant pressure upon the sleeve and key of such a character as to tend to maintain close engagement of the feed mechanism and the rack teeth of the spindle.

WILLIAM C. VAN DRESSER.